(12) United States Patent
Stantchev

(10) Patent No.: US 10,836,979 B2
(45) Date of Patent: Nov. 17, 2020

(54) APPARATUS AND METHOD FOR PLANT EXTRACTION

(71) Applicant: George Stantchev, Phoenix, AZ (US)

(72) Inventor: George Stantchev, Phoenix, AZ (US)

(*) Notice: Subject to any disclaimer, the term of this patent is extended or adjusted under 35 U.S.C. 154(b) by 507 days.

(21) Appl. No.: 15/641,672

(22) Filed: Jul. 5, 2017

(65) Prior Publication Data
US 2018/0010066 A1 Jan. 11, 2018

Related U.S. Application Data

(60) Provisional application No. 62/441,003, filed on Dec. 30, 2016, provisional application No. 62/358,583, filed on Jul. 6, 2016.

(51) Int. Cl.
| | | |
|---|---|---|
| *C11B 9/02* | (2006.01) |
| *B01D 3/38* | (2006.01) |
| *B01D 11/02* | (2006.01) |
| *B01D 3/10* | (2006.01) |
| *B01J 19/12* | (2006.01) |
| *B01J 19/24* | (2006.01) |

(52) U.S. Cl.
CPC ............... *C11B 9/02* (2013.01); *B01D 3/10* (2013.01); *B01D 3/38* (2013.01); *B01D 11/0257* (2013.01); *B01D 11/0288* (2013.01); *B01D 11/0296* (2013.01); *B01J 19/122* (2013.01); *B01J 19/24* (2013.01); *C11B 9/025* (2013.01); *C11B 9/027* (2013.01); *B01D 11/0207* (2013.01); *B01D 11/028* (2013.01); *B01J 2219/0879* (2013.01); *B01J 2219/1203* (2013.01)

(58) Field of Classification Search
CPC ............ B01D 11/0207; B01D 11/0257; B01D 11/028; B01D 11/0288; B01D 11/0296; B01D 3/10; B01D 3/38; B01D 11/0203; B01J 19/122; B01J 19/24; B01J 2219/0879; B01J 2219/1203; C11B 9/02; C11B 9/025; C11B 9/027
See application file for complete search history.

(56) References Cited

U.S. PATENT DOCUMENTS

| | | | |
|---|---|---|---|
| 5,512,285 A † | 4/1996 | Wilde |
| 6,455,087 B1 † | 9/2002 | Nicola |
| 6,589,422 B2 † | 7/2003 | Low |
| 2002/0182722 A1 † | 12/2002 | Corr |

OTHER PUBLICATIONS

Andrew P. Abbott, Wayne Eltringham, Eric G. Hope e Mazin Nicola, *Hydrogenation in supercritical 1,1,1,2 tetrafluoroethane (HFC 134a)*, in Green Chemistry, vol. 7, n° 10, 2005, pp. 721, DOI:10.1039/B507554H†
Stuart Corr, *1,1,1,2-Tetrafluoroethane (R-134a): A Selective Solvent for the Generation of Flavor and Fragrance Ingredients*, in Natural Flavors and Fragrances, ACS Symposium Series, vol. 908, 2005, p. 41, DOI:10.1021/bk-2005-0908.ch003, ISBN 0-8412-3904-5.†
Andrew P. Abbott, Wayne Eltringham, Eric G. Hope e Mazin Nicola, *Solubility of unsaturated carboxylic acids in supercritical 1,1,1,2-tetrafluoroethane (HFC 134a) and a methodology for the separation of ternary mixtures*, in Green Chemistry, vol. 7, n° 4, 2005, pp. 210, DOI:10.1039/B412697A.†
Rocky Costello, Pedondo Beach, CA, 1999-2000, Appendices, A, D, F, H, and O, 28 pages total.†

† cited by third party

*Primary Examiner* — Aaron J Kosar
(74) *Attorney, Agent, or Firm* — Rosenberg, Klein & Lee (57) ABSTRACT

An apparatus and a method for plant extraction are disclosed. The apparatus of the present invention comprises an extraction module, a separating module and a reservoir. The method essentially includes plant material preparing, decarboxylating, active components extracting and separating. By using liquid tetrafluoroethane as the solvent in the apparatus of the present invention, the active components of the plant material are efficiently extracted under low pressure extraction and high pressure extraction conditions.

18 Claims, 8 Drawing Sheets

APPARATUS AND METHOD FOR PLANT EXTRACTION

This application is based on Provisional applications Ser. No. 62/358,583, filed Jul. 6, 2016 and No. 62/441,003, filed Dec. 30, 2016.

FIELD OF THE INVENTION

The present invention is related to an apparatus for plant extraction, more particularly to an apparatus and a method for plant extraction which use refrigerant with tetrafluoroethane as the solvent and perform low pressure extraction (LPE) and/or high pressure extraction (HPE).

BACKGROUND OF THE INVENTION

Essential oils are used in a wide variety of consumer goods such as detergents, soaps, toilet products, cosmetics, pharmaceuticals, perfumers confectionery food products, soft drinks, distilled alcoholic beverages and insecticides. The world production and consumption of essential oils and perfumes are increasing very fast. Production technology is an essential element to improve the overall yield and quality of essential oil. The traditional technologies pertaining to essential oil processing are of great significance and are still being used in many parts of the globe.

Water distillation, water and steam distillation, steam distillation, cohobation, maceration and enfleurage are the most traditional and commonly used methods. Maceration is adaptable when oil yield from distillation is poor. Distillation methods are good for powdered almonds, rose petals and rose blossoms, whereas solvent extraction is suitable for expensive, delicate and thermally unstable materials jasmine, tuberose, and hyacinth. Water distillation is the most favored method of production of citronella oil from plant material.

Essential oils are generally derived from one or more plant parts, such as flowers, leaves, stems, bark, wood, roots, seeds, fruits, rhizomes, and gums or oleoresin exudations.

However, some plants need more treatments to improve the final yield and composition of the extraction.

The present invention provides apparatuses and method for improving the final yield and composition of the extraction for plants like cannabis plants.

SUMMARY OF THE PRESENT INVENTION

It is an objective of the present invention to provide an apparatus for plant extraction, more particularly an apparatus and a method for plant extraction with tetrafluoroethane as the solvent and perform low pressure extraction and high pressure extraction.

It is another objective of the present invention to provide an apparatus comprising an extraction module for plant material treatment and active components extraction. In the above extraction module, various solvents may be used to transform the plant material and extract the target components in sequential steps.

It is still another objective of the present invention to provide an apparatus comprising a separating module for separating the active components from the solvent. The separating module is in multiples to the solvent and process used and designed to reflect the type of solvent or process.

It is still another objective of the present invention to provide an apparatus which recycles the solvent for extraction process. When multiple solvents are used a multiple separation and solvent recycle processes are implemented.

It is still another objective of the present invention to provide a complete, cost and process efficient method for continuous plant extraction which efficiently extracts active components from the plant material and recycles the solvent for the next extraction process.

The present invention provides an apparatus for plant extraction comprising: a reservoir storing a liquid tetrafluoroethane; an extraction module including an extractor and a filter, wherein the extractor is configured to contain a plant material and is connected to the reservoir with a first inlet pipe and the filter is disposed, at a bottom of the extractor for filtering the plant material, wherein the plant material is soaked in the liquid tetrafluoroethane from the reservoir to extract active components of the plant material and form a solution with the active components; a separating module including a separator, a second heater and a first container, wherein the separator is connected to the bottom of the extractor with a second inlet pipe and connected to the reservoir with a second outlet pipe, the second heater is disposed around the separator to vaporize the liquid tetrafluoroethane of the solution to a gaseous tetrafluoroethane and the first container is connected at a bottom of the separator to receive the active components left in the separator; and a second outlet pump disposed on the second outlet pipe, wherein the gaseous tetrafluoroethane in the separator is conducted by the second outlet pipe to the second outlet pump, compressed into the liquid tetrafluoroethane and then conducted to the reservoir.

In one embodiment of the present invention, the extraction module further comprises a first heater disposed around the extractor.

In one embodiment of the present invention, the extractor further comprises an inlet valve and an outlet valve.

In one embodiment of the present invention, the extraction module further comprises a first outlet pipe and a first outlet pump, wherein the first outlet pipe is connected between the extractor and the reservoir and the first outlet pump is disposed on the first outlet pipe for compressing a gaseous tetrafluoroethane into the liquid tetrafluoroethane.

In one embodiment of the present invention, the extraction module further comprises a first inlet pump disposed on the first inlet pipe.

In one embodiment of the present invention, the first inlet pipe is connected to bottom of the extractor.

In one embodiment of the present invention, the extraction module further comprises an assistant device disposed in the extractor for enhancing efficiency of extraction.

In one embodiment of the present invention, the assistant device is selectively one of a stirrer, a set of cartridges or the combination thereof.

In one embodiment of the present invention, the separating module further comprises a second inlet pump disposed on the second inlet pipe.

In one embodiment of the present invention, the second outlet pump is replaced by an external heat pump, wherein the heat pump has a heating element connected to the second heater of the separating module and a cooling element connected to the reservoir, wherein the gaseous tetrafluoroethane in the separator is conducted by the second outlet pipe to the reservoir, cooled by the cooling element and liquefied to the liquid tetrafluoroethane.

In one embodiment of the present invention, the separating module further comprises a vacuum distillation unit disposed on the separator.

In one embodiment of the present invention, the vacuum distillation unit includes a multistage reflux rectification column, a condenser, a vacuum pump and a second container, wherein the multistage reflux rectification column is disposed on the separator, the condenser is connected to the multistage reflux rectification column, the vacuum pump is connected to the condenser, and the second container is connected to a bottom of the condenser.

In one embodiment of the present invention, the apparatus further comprises a pressure control device and a serpentine disposed on the second inlet pipe, wherein the pressure control device is configured to decompress the solution in the second inlet pipe and the serpentine is attached to the reservoir.

In one embodiment of the present invention, the pressure control device is a needle valve.

In one embodiment of the present invention, the second outlet pump is replaced by an air cooling device.

In one embodiment of the present invention, the apparatus further comprises at least one auxiliary reservoir storing an auxiliary solvent; and at least one auxiliary separating module corresponding to the auxiliary reservoir; wherein the at least one auxiliary reservoir is connected to the extraction module with a first auxiliary pipe; wherein the plant material in the extraction module is soaked in the auxiliary solvent to extract active components of the plant material; and wherein the at least one auxiliary separating module is connected to the bottom of the extractor to separate the active components and the auxiliary solvent.

In one embodiment of the present invention, the auxiliary solvent is selectively one of a dry steam, a water-alcohol solution, a dimethyl sulfoxide or a water.

In one embodiment of the present invention, the apparatus further comprises a filter unit connected between the extraction module, the separating module and the at least one auxiliary separating module.

In one embodiment of the present invention, the filter unit is selectively one of a static phase absorber, a molecular sift, a column chromatography, a silica gel filament, a particle chromatography or a moving bed chromatography.

The present invention further provides a method for plant extraction comprising: preparing a plant material by grinding or cutting to a predetermined size; decarboxylating the plant material; extracting active components from the plant material by soaking the plant material in a liquid tetrafluoroethane to dissolve the active components and form a solution with the active components; separating the active components from the solution by vaporize the liquid tetrafluoroethane to a gaseous tetrafluoroethane; and liquefying the gaseous tetrafluoroethane to the liquid tetrafluoroethane for recycling.

In one embodiment of the present invention, the step of decarboxylating the plant material is selectively performed in one of a heating decarboxylation process, an ionic flow decarboxylation process or an enzymatic decarboxylation process.

In one embodiment of the present invention, the step of decarboxylating the plant material is enhanced by applying an electromagnetic field to the plant material.

In one embodiment of the present invention, the step of decarboxylating the plant material is performed before the plant material is loaded in an extractor.

In one embodiment of the present invention, the step of decarboxylating the plant material is performed after the plant material is loaded in an extractor and before the step of soaking the plant material in the liquid tetrafluoroethane.

In one embodiment of the present invention, the step of decarboxylating the plant material is performed after the step of soaking the plant material in the liquid tetrafluoroethane.

In one embodiment of the present invention, the extraction module further allows use of sequential multiple solvent extractions with dedicated separation vessels. As example, the following processes are used: dry steam, LPE/HPE, 60% ethanol, DMSO solvent extractions.

In one embodiment of the, present invention, the extraction module further performs as a first step dry steam extraction that extracts the volatile compounds and decarboxylate the material. After cooling the steam, the volatile components are collected in separate condenser/separator vessel. The steam extraction is known state of art and will not be discussed in detail.

In one embodiment of the present invention, the extraction module further performs water-alcohol extraction and collects the extracted components in a dedicated separator after evaporating and recycling the alcohol. The alcohol extraction is known state of art and will not be discussed in detail.

In one embodiment of the present invention, the step of extracting the active components is performed under a low pressure and low temperature condition.

In one embodiment of the present invention, the step of extracting the active components is performed under a high pressure and high temperature condition.

In one embodiment of the present invention, the step of separating the active components from the solution further comprises a step of separating the active components by vacuum distillation.

DETAILED DESCRIPTION OF THE PREFERRED EMBODIMENTS

Figure 1:
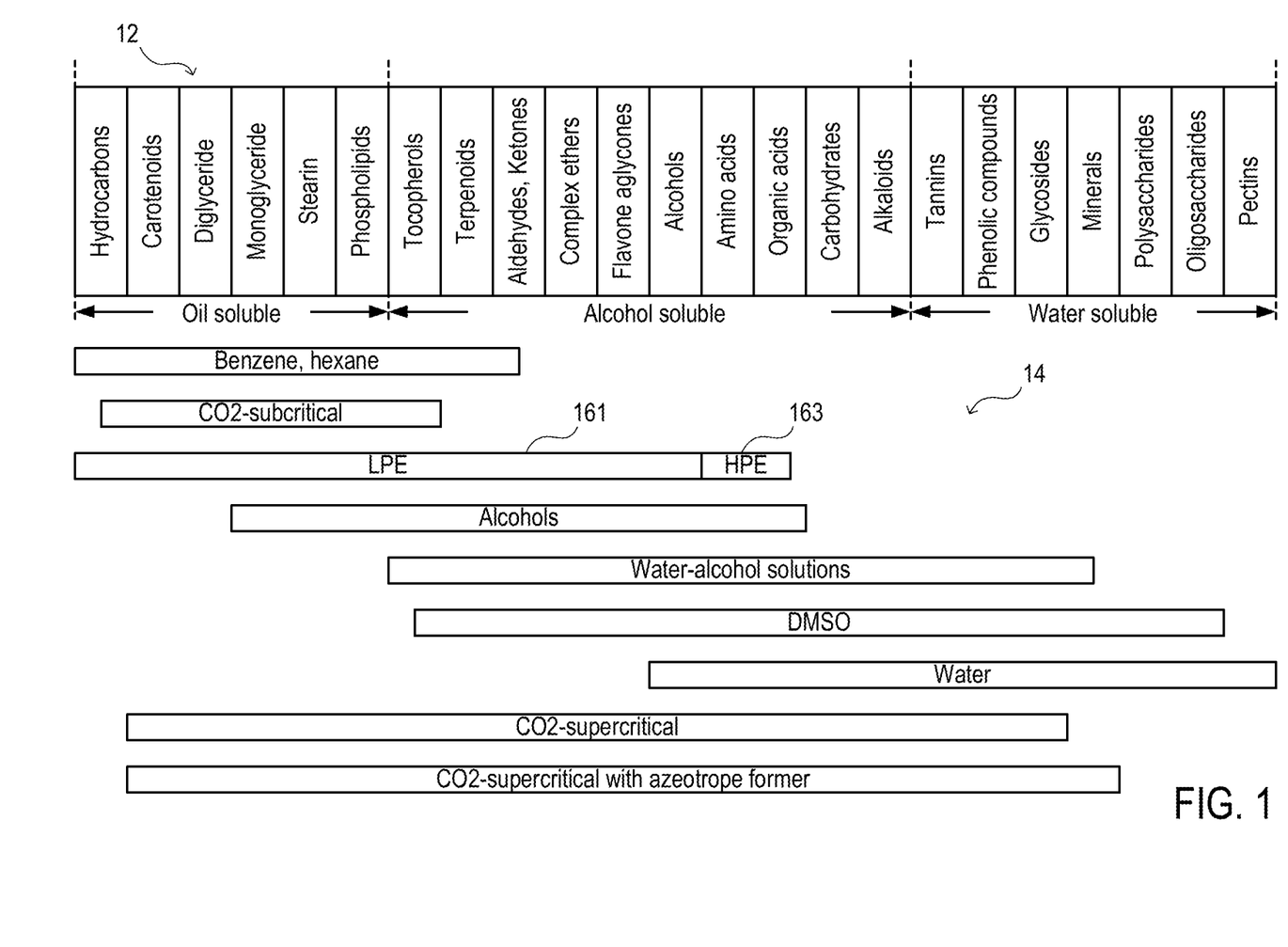
FIG. 1 is a schematic diagram showing the most popular extraction methods and the compounds they extract from the plants.

Referring to FIG. 1, there is shown a schematic diagram of the most popular extraction methods and the compounds they extract from the plants. The compounds 12 that are usually extracted from the plants include: hydrocarbons, carotenoids, diglycerides, monoglycerides, stearin, phospholipids, tocopherols, terpenoids, aldehydes, ketones, ethers, flavone glycols, alcohols, amino acids, organic acids, carbohydrates, alkaloids, tannins, phenolic compounds, glycosides, minerals, polysaccharides, oligosaccharides, pectins, etc. The compounds 12 are roughly classified to oil soluble, alcohol soluble and water soluble. The extraction methods 14, such as benzene extraction, hexane extraction, carbon dioxide extraction, alcohols extraction, water-alcohol solutions extraction, water extraction and dimethyl sulfoxide (DMSO) extraction, are adapted to extract a set of compounds respectively.

Hydrofluorocarbon refrigerants and in particular the tetrafluoroethane are becoming very popular solvents for botanicals due to their ability to directly and selectively extract mobile liquid fragrant oils but not solid waxy concretes. In the present invention, the tetrafluoroethane (TFE) term is used as reference to standard refrigerants as R134 and mixtures thereof, for example R404, R410 and R407.

The low pressure extraction (LPE) 161 and high pressure extraction (HPE) 163 processes with liquid tetrafluoroethane of the present invention are adapted to extract oil soluble and most of alcohol soluble compounds including hydrocarbons carotenoids, diglycerides, monoglycerides, stearin, phospholipids, tocopherols, terpenoids, aldehydes, ketones, ethers, flavone glycols, alcohols, amino acids and organic acids. The extracts produced contain terpenes (mono, sesqui, di and triterpenes), ketones, aldehydes, alcohols, hydrocarbons, fatty acid, lactones, etc. The active components of the plant material can be used in medicine, used in edibles as a flavor or used in perfumery as a fragrance.

The selectivity of the tetrafluoroethane under the low pressure conditions is very limited and some substances, for example the acids, are not extracted. Utilizing a high pressure extraction will allow extraction of extended range substances as well allow further separation of those. The processes described above are visualized at FIG. 1. As an example, a low pressure process performed at 8 bars and 36° C. will extract according the LPE process and at 31 bars and 90° C. will perform as HPE process.

Figure 2:
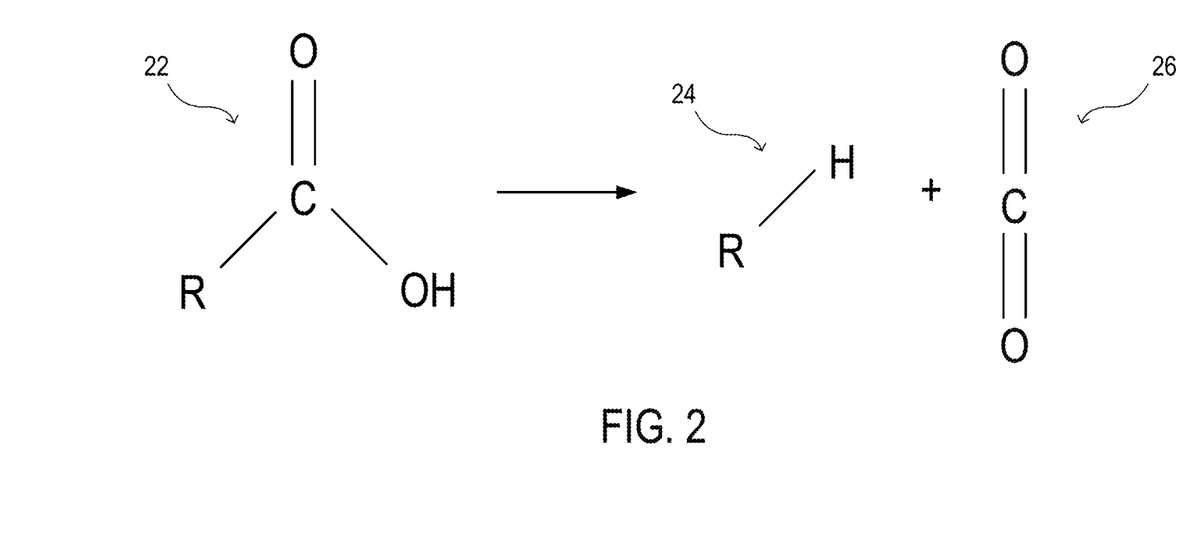
FIG. 2 is a schematic diagram showing a decarboxylation process in accordance with one embodiment of the present invention.
Figure 3:
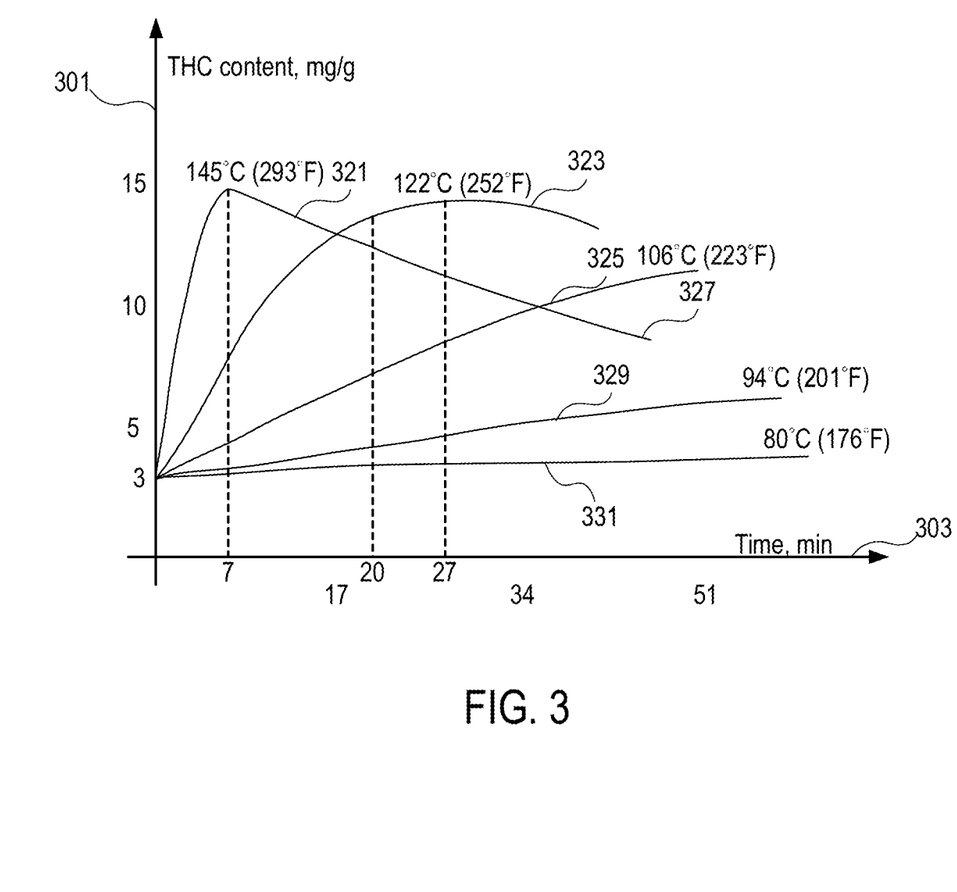
FIG. 3 is a schematic diagram showing the effect of heating time and temperature on THC content in accordance with one embodiment of the present invention.

Referring to FIG. 2 and FIG. 3, there are shown schematic diagrams of a decarboxylation process and the effect of heating time and temperature on THC content in accordance with one embodiment of the present invention. Decarboxylation is a chemical reaction that removes a carboxyl group (COOH), replaces it with, a proton (H) and releases carbon dioxide ($CO_2$) 26. Usually, decarboxylation refers to a reaction of carboxylic acids 22, removing a carbon atom from a carbon chain. During the decarboxylation, the acids 22 are converted to light alcohols 24 and can be extracted easier at low temperatures. For example, cannabidiolic acid (CBDA) and tetrahydrocannabinolic acid (THCA) are converted to cannabidiol (CBD) and tetrahydrocannabinol (THC) during a decarboxylation process.

Decarboxylation may be performed by various processes, such as:

1. Temperature stimulating the decarboxylation (heating decarboxylation process);
2. Enzymes catalyzing the decarboxylation (enzymatic decarboxylation process); and
3. Ionized air initiating oxygen exchange (ionic flow decarboxylation process).

In heating decarboxylation process, the decarboxylation may be achieved in shorter time at higher temperatures as shown in FIG. 3, wherein the curves 321, 323, 325, 327, 329 and 331 show the THC contents 301 at different temperatures according to time axis 303.

Enzymes that catalyze decarboxylations are called decarboxylases. Once the acid components are transformed to alcohols by the active enzymes, they can be extracted with TFE at low temperature and pressure conditions.

Proto-decarboxylation involves the conversion of a carboxylic acid to the corresponding hydrocarbon. This is conceptually the same as the more general term "decarboxylation" as defined above except that it specifically requires that the carboxyl group is replaced by a proton. The reaction is especially common in conjunction with the malonic ester synthesis and Knoevenagel condensations. The reaction involves the conjugate base of the carboxyl group, a carboxylate ion and an unsaturated receptor of electron density, such as a protonated carbonyl group, where reactions entail heating the carboxylic acid with concentrated hydrochloric acid, such a direct route is impossible as it would produce protonated carbon dioxide. In these cases, the reaction is likely to occur by initial addition of water and a proton.

All above reactions may be additionally stimulated by using modulated electromagnetic fields. For example, the applied electromagnetic field is modulated with corresponding wavelength to transfer the energy necessary to activate a proton exchange. The energy required for a proton exchange during the decarboxylation process according to multiple studies is around 20 kJ per mole, therefore 207 J is the energy needed to stimulate a single proton exchange. The corresponding wavelength transferring 207 J is $9.5 \times 10^{-28}$ m. Consequently, the decarboxylation process can be improved by applying electromagnetic field with the corresponding wavelength to the apparatus. The process will also require insertion of oxygen and venting the $CO_2$.

A thermal decarboxylation can be performed when the plant material is placed in the extractor (420 in FIG. 4) and instead heated by the extractor heater is exposed to a dry stream. The dry stream forms at temperatures above 145° C. and pressures above 6 bars. Therefore, the steam is heated to over 145° C. and the decarboxylation is performed in the extractor 420 after the plant material is loaded for 7 minutes. The air leaving the extractor 420 is introduced to a condenser and the most volatile components are recaptured. After the decarboxylation is complete the solvent is introduced to the vessel. This is the fastest and most efficient method of operation of the equipment.

As noted earlier the decarboxylation is a process of converting one chemical to another under a thermal influence. That thermal influence is not only removing the carboxyl group but also destructing the lower temperature chemicals. Example values are given in Table 1.

TABLE 1

| Material | THCA | THC | CBDA | CBD | CBN |
|---|---|---|---|---|---|
| Not decarb plant | 17.0% | 6.47% | 0.88% | 0.01% | 0.01% |
| Decarb 7 min/145 C. | 0.58% | 20.2% | 0.32% | 0.01% | 0.07% |
| Decarb 30 min/115 C. | 0.12% | 20.9% | 0.18% | 0.01% | 0.15% |
| Decarb 60 min/115 C. | 0.12% | 17.9% | 0.06% | 0.01% | 0.18% |

Figure 4:
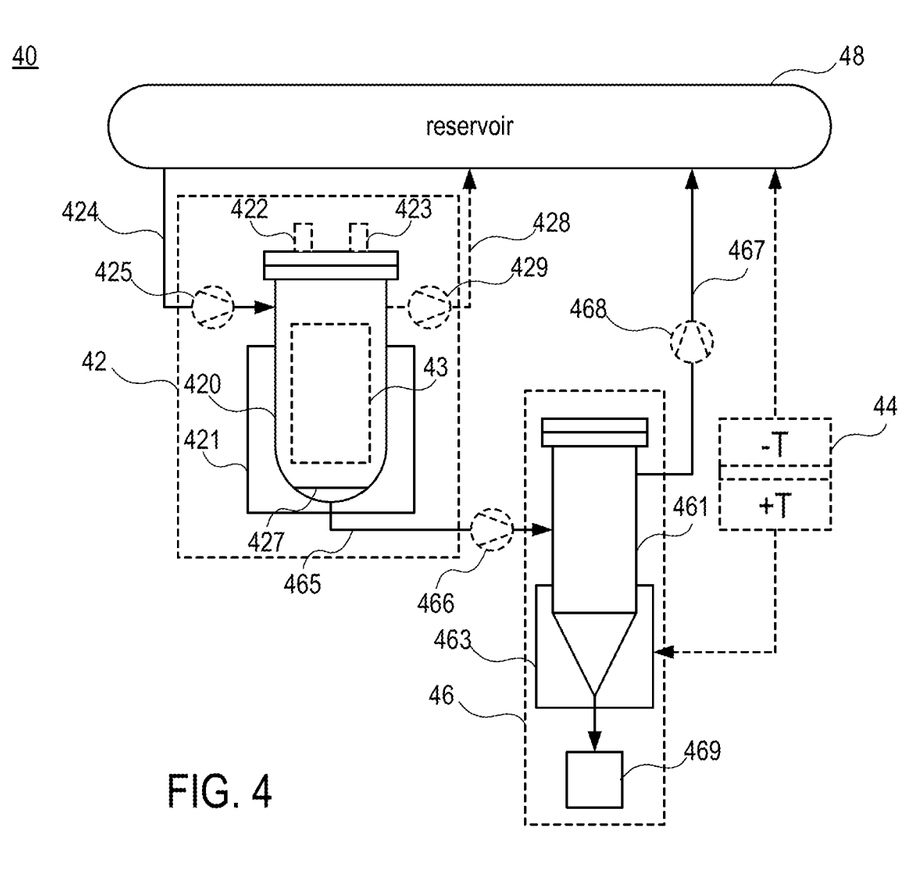
FIG. 4 is a schematic diagram showing an apparatus for plant extraction in accordance with one embodiment of the present invention.

Referring to FIG. 4, there is shown an apparatus for plant extraction in accordance with one embodiment of the present invention. The apparatus 40 for plant extraction comprises: a reservoir 48, an extraction module 42, a separating module 46, and a second outlet pump 468. The reservoir 48 is configured to store a liquid TFE. The extraction module 42 comprises a vessel as an extractor 420 and a filter 427. The extractor 420 is connected to the reservoir 48 with a first inlet pipe 424 and the filter 427 is disposed at the bottom of the extractor 420. The plant material (not shown) is put into the extractor 420 and is soaked in the liquid TFE from the reservoir 48. The active components of the plant material are dissolved by the liquid. TFE to form a solution with the active components.

The plant material is placed in the extractor 420 wherein the plant material may be decarboxylated by one or combination of the above methods. The extractor 420 may have inlet valve 422 and outlet valve 423 inserting and releasing dry steam, $CO_2$ or oxygen, decarboxylases or any other constituents needed for efficient decarboxylation or applying electromagnetic fields to catalyze the decarboxylation process. Auxiliary equipments for capturing the volatile oils leaving the vessels after the decarboxylation are not shown as they known art.

The separating module 46 comprises a separator 461, a second heater 463 and a first container 469. The separator 461 is connected to the bottom of the extractor 420 with a second inlet pipe 465 and connected to the reservoir 48 with a second outlet pipe 467. The second heater 463 is disposed around the separator 461. The first container 469 is connected to the bottom of the separator 461. The second outlet pump 468 is disposed on the second outlet pipe 467.

The solution in the extractor 420 is filtered by the filter 427 and conducted to the separator 461 by the second inlet pipe 465. The solution in the separator 461 is heated by the heater 463 to vaporize the liquid TFE to gaseous TFE. The gaseous TFE is conducted by the second outlet pipe 467 to the second outlet pump 468 compressed into liquid TFE and then conducted to the reservoir 48. The active components are left in the separator 461 and conducted to the first container 469.

In the present embodiment, the decarboxylation process of the plant material may be performed before the plant material is introduced in the extractor 420. In this case, an external temperature controlled equipment (not shown) is used for the plant material treatment. The negatives of this treatment are that most of the volatile components may escape while plant material is processed in the equipment.

In one embodiment of the present invention, the extraction module 42 further comprises a first heater 421 disposed around the extractor 420 to control the temperature of the extractor 420. In this case, the extraction of the active components can be performed under different temperature conditions.

In one embodiment of the present invention, the extractor 420 further comprises an inlet valve 422 and an outlet valve 423. In this case, the decarboxylation process of the plant material can be performed after the plant material is introduced in the extractor 420 and before the plant material is soaked in the liquid TFE. In the decarboxylation process, the extractor 420 with the plant material is heated to a predetermined temperature (such as 115° C.) for a predetermined period (such as 30 or 60 minutes), wherein air or oxygen may be introduced in the extractor 420 from the inlet valve 422 and the air and the carbon dioxide are vented from the outlet valve 423 and further may the volatile oils separated (equipment not shown). After the decarboxylation process, liquid TFE is introduced in the extractor 420 from the first inlet pipe 424 for extraction.

In one embodiment of the present invention, the extraction module 42 further comprises a first outlet pipe 428 and a first outlet pump 429. The first outlet pipe 428 is connected between the extractor 420 and the reservoir 48 and the first outlet pump 429 is disposed on the first outlet pipe 428. In this case, the decarboxylation process can be performed after the plant material is soaked in the liquid TFE. In the decarboxylation process, the extractor 420 is heated to a predetermined temperature and a part of the liquid TFE may be vaporized to gaseous TFE. After the decarboxylation process, the gaseous TFE is conducted, by the first outlet pipe 428 to the first outlet pump 429, compressed into liquid TFE and then conducted to the reservoir 48. The fresh liquid TFE is introduced in the extractor 420 by the first inlet pipe 424 for extraction. In this case, the extractor 420 is designed to support the high pressure during the decarboxylation and soaking process, for example 50 bars for decarboxylation at 114° C. for 30 minutes.

In one embodiment of the present invention, the extraction module 42 further comprises a first inlet pump 425 disposed on the first inlet pipe 424. In this case, the pressure in the extractor 420 can be adjusted higher by the first inlet pump 425 and lower by the first outlet pump 429. The temperature of the extractor 420 can be adjusted by the first heater 421. Therefore, the temperature and pressure in the extractor 420 can be independently controlled to perform LPE process and HPE process. When the extracting conditions (such as pressure and temperature in the extractor 420) are changed the potency of the solvent for extracting the constituents changes accordingly. Therefore, the active components extracted under LPE condition (for example, at a low pressure of 6-10 bars and temperature of 20-30° C.) are different from the active components extracted under HPE condition (for example, at a high pressure of 35-50 bars and temperature of 30-45° C.) (please refer to FIG. 1).

In one embodiment of the present invention, the extraction module 42 further comprises an assistant device 43 disposed in the extractor 420 for enhancing the efficiency of extraction. The assistant device 43 is selectively one of a stirrer, a set of cartridges or the combination thereof. By equipping a stirrer or/and a set of proper designed cartridges in the extractor 420, the contact frequency and surface of the plant material and the liquid TFE are increased, the extraction time and yield are improved accordingly.

Further, the inlet pipe 424 can take gas TFE from the reservoir 48 of and from the separator 461 vapor section and inject it in the extractor 420. The inlet pipe 424 may be connected to the bottom of the extractor 420. In this configuration, the inlet pump 425 is pumping gas TFE through the bottom of the extractor 420 and will cause contactless agitation. This will eliminate the assistant device (mechanical stirrer) 43 and improve the process yield and equipment reliability.

In one embodiment of the present invention, the separating module 46 further comprises a second inlet pump 466 disposed on the second inlet pipe 465 to speed up the system flow circulation.

In one embodiment of the present invention, the second outlet pump 468 is replaced by an external heat pump 44. In this case, the second outlet pipe 467 is directly connected between the separator 461 and the reservoir 48. The heat pump 44 comprises a heating element +T and a cooling element −T. The heating element +T is connected to the second heater 463 of the separating module 46 and the cooling element −T is connected to the reservoir 48. The gaseous TFE in the separator 461 is conducted by the second outlet pipe 467 to the reservoir 48 and is cooled and liquefied to the liquid TFE by the cooling element −T.

Figure 5:
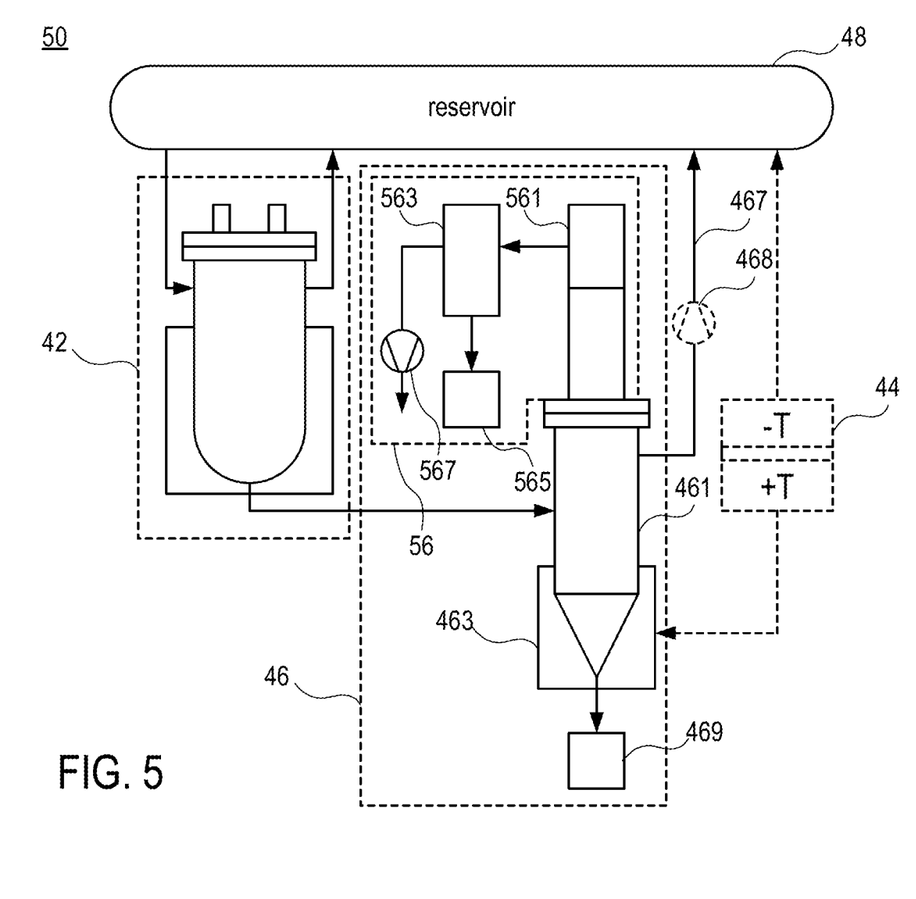
FIG. 5 is a schematic diagram showing an apparatus for plant extraction in accordance with another embodiment of the present invention.

Referring to FIG. 5, there is shown a schematic diagram of an apparatus for plant extraction in accordance with another embodiment of the present invention. The apparatus 50 of the present embodiment is substantially the same as the embodiment shown in FIG. 4 but comprises a vacuum distillation unit 56 in the separating module 46. The vacuum distillation unit 56 comprises a multistage reflux rectification column 561, a condenser 563, a vacuum pump 567 and a second container 565. The multistage reflux rectification column 561 is disposed on the separator 461. The condenser 563 is connected to the multistage reflux rectification column 561. The vacuum pump 567 is connected to the condenser 563. The second container 565 is connected to the bottom of the condenser 563.

When the solution with the active components is heated by the second heater 463, the liquid TFE is firstly vaporized to gaseous TFE and conducted by the second outlet pipe 467 to the reservoir 48. The active components are left in the separator 461. If the separator 461 is further heated, the most volatile components of the active components will be vaporized and conducted, to the multistage reflux rectification column 561 and the condenser 563 by a vacuum created from the vacuum pump 567. Then, the most volatile components of the active components are condensed by the condenser 563 and received in the second container 565. The residues of the active components in the separator 461 are received in the first container 469. Therefore, the active components are further separated.

Figure 6:
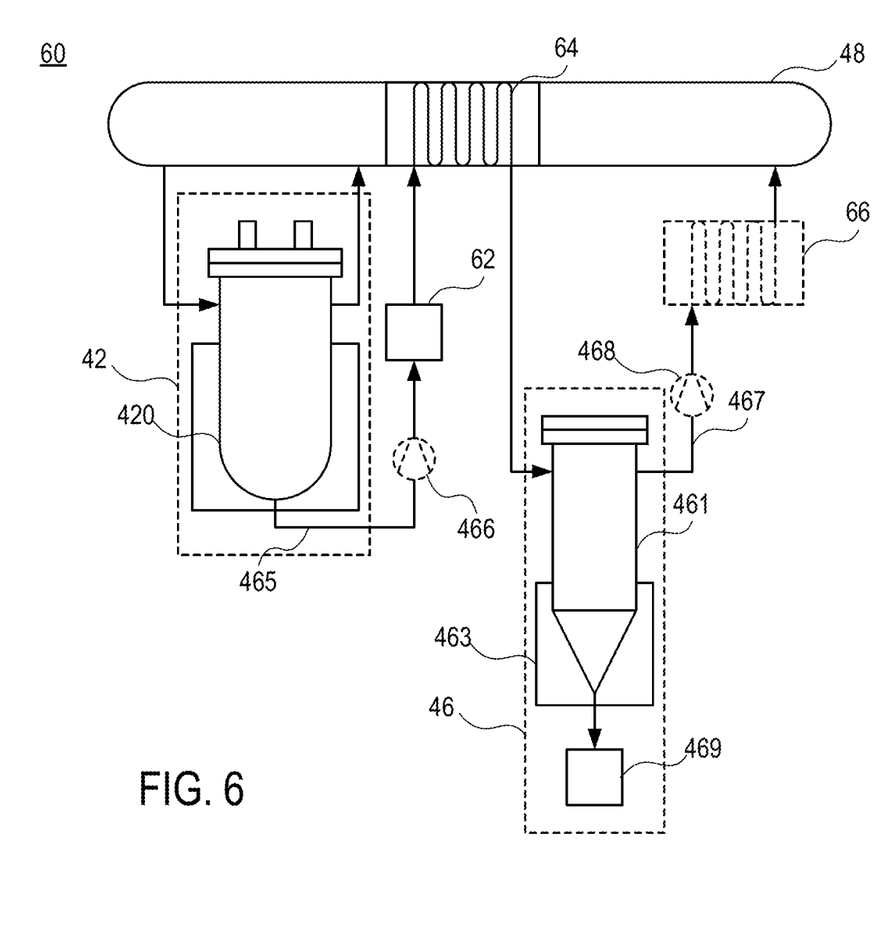
FIG. 6 is a schematic diagram showing an apparatus for plant extraction in accordance with still another embodiment of the present invention.

Referring to FIG. 6, there is shown an apparatus for plant extraction in accordance with still another embodiment of the present invention. The apparatus 60 of the present embodiment is substantially the same as the embodiment shown in FIG. 4 but comprises a pressure control device 62 and a serpentine 64 disposed on the second inlet pipe 465 in sequence. The pressure control device 62 is configured to decompress the solution. The serpentine 64 is attached to the reservoir 48.

In this case, the solution with the active components is decompressed by the pressure control device 62 and a part of the liquid TFE is vaporized in the serpentine 64 acting as a first stage vaporization. During the vaporization, heat is absorbed by the liquid TFE through the serpentine 64. Therefore, the reservoir 48 is cooled by the serpentine 64 and helps the gaseous TFE in the reservoir 48 to liquefy.

In one embodiment of the present invention, the pressure control device 62 is a needle valve.

In one embodiment of the present invention, the second outlet pump 468 is replaced by an air cooling device 66. In this case, the gaseous TFE from the separator 461 is conducted by the second outlet pipe 467 to the reservoir 48 and is cooled in the cooling device 66. That improves the evaporation from the separator 461.

In one embodiment of the present invention, the circulation flow may increase by disposing the second inlet pump 466 on the second inlet pipe 465.

Figure 7:
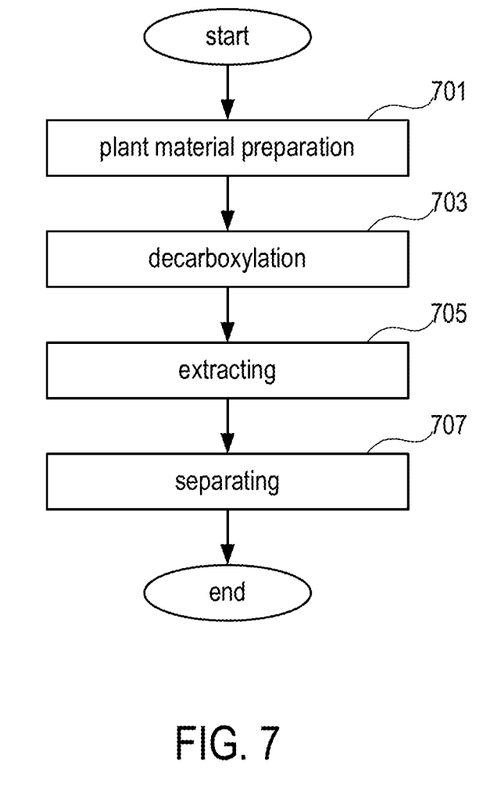
FIG. 7 is a flowchart showing a method for plant extraction in accordance with one embodiment of the present invention.

Referring to FIG. 7, there is shown a flowchart of a method for plant extraction in accordance with one embodiment of the present invention. As shown in the figure and the aforementioned discussion, the method of the present invention comprises a step of plant material preparation which prepares the plant material by grinding or cutting to a predetermined size, as shown in step 701. The size of the plant material should be proportional to the mesh of the filter used in the extractor. For example, if the mesh of the filter is 50 microns, the size of the plant material should be more than 70 microns. The plant material preparation can be performed before the extraction or during the process of loading the plant material in the extraction chamber from the same equipment.

After the preparation process, the plant material is steam extracted or decarboxylated to speed up the process time and improve the final yield and composition of the extraction, as shown in step 703. As the aforementioned discussion, the step of decarboxylating the plant material can be performed in heating decarboxylation process, ionic flow decarboxylation process or enzymatic decarboxylation process. The decarboxylation process can be enhanced by applying an electromagnetic field with a predetermined wavelength to the plant material. Moreover, the decarboxylation process may be performed before the plant material is introduced in an extractor, after the plant material is introduced in the extractor and before soaked in the liquid TFE, or after the plant material is soaked in the liquid TFE.

In one embodiment of the present invention, the decarboxylation process may be performed by dry steam passing through the plant material. The dry stream forms at temperatures above 145° C. and pressures above 6 bars. Therefore, the steam is heated to over 145° C. and the decarboxylation is performed in the extractor after the plant material is loaded for 7 minutes. The air leaving the extractor is introduced to a condenser and the most volatile components are recaptured.

After the plant material is decarboxylated, the active components are extracted the plant material by soaking the plant material in the liquid TFE to dissolve the active components, as shown in step 705. The active components are dissolved in the liquid TFE and form a solution. And then, the solution is filtered by a filter and conducted to a separating module to separate the active components from the liquid TFE, as shown in step 707.

In one embodiment of the present invention, the extraction process can be performed under low pressure and temperature condition as a low pressure extraction (LPE) process, or under high pressure and temperature condition as a high pressure extraction (HPE) process.

In one embodiment of the present invention, the separation process can further comprise a process of vacuum distillation.

Figure 8:
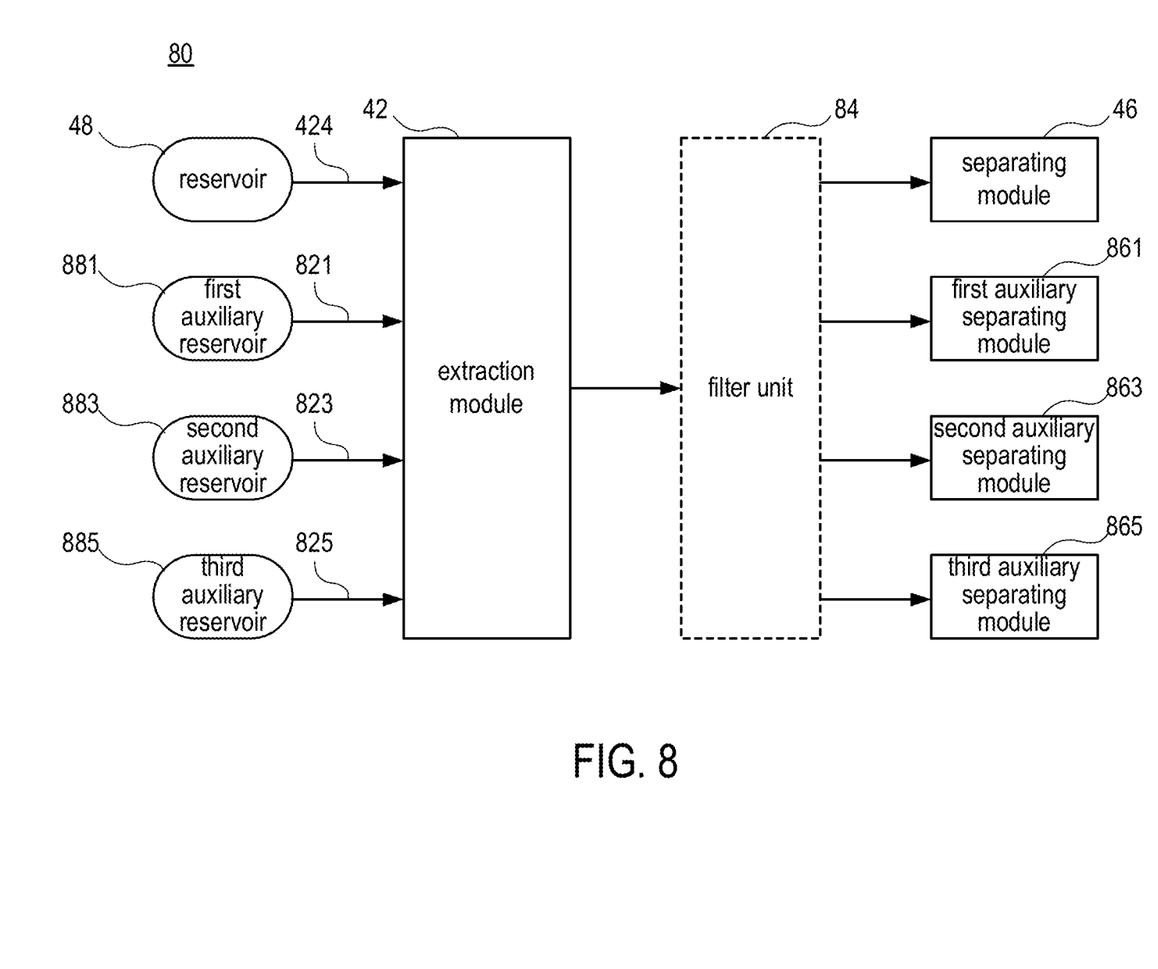
FIG. 8 is a schematic diagram showing an apparatus for plant extraction in accordance with still another embodiment of the present invention.

Referring to FIG. 8, there is shown an apparatus for plant extraction in accordance with still another embodiment of the present invention. The apparatus 80 of the present embodiment is based on the embodiment shown in FIG. 4 and further comprises at least one auxiliary reservoir 881, 883 or 885 and at least one separating module 861, 863 or 865. The auxiliary reservoirs 881, 883 and 885 are connected to the extraction module 42 with auxiliary pipes 821, 823 and 825 respectively. The auxiliary separating module 861, 863 or 865 is connected to the bottom of the extractor to separate the active components and the auxiliary solvent.

The auxiliary reservoir 881 883 or 885 stores auxiliary solvent, such as dry steam, water-alcohol solution, dimethyl sulfoxide (DMSO) or water. The auxiliary separating module 861, 863 or 865 is corresponding to the auxiliary reservoir and the auxiliary solvent. For example, if the auxiliary reservoir 881 stores dry steam, the corresponding auxiliary separating module 861 is a condenser to chill the air from the extractor and capture the volatile oils of the active components.

In one embodiment of the present invention, the apparatus 80 further comprises a filter unit 84 to improve the selectivity of the extraction process. The filter unit 84 can contain static phase absorber and act as a molecular sift or a column chromatography using as example a silica gel filament. Further instead column chromatography, another type of continues chromatography process can be used as example particle chromatography or moving bed chromatography that may have more than one output. The separating module 46 and auxiliary separating module 861, 863 or 865 are connected to the output of the filter unit 84 to remove the solvent and the auxiliary solvent.

In one embodiment of the present invention, the reservoir (solvent) 48, auxiliary reservoir (auxiliary solvent) 881, 883 and 885 are applied sequentially to the extraction module 42 usually from the more volatile to the less volatile solvent dissolving oil to water soluble components. After the extraction processes, corresponding separating module 46, auxiliary separating module 861, 863 and 865 are used to remove the solvent and the auxiliary solvent. Therefore, there will be four different fractions as a result of each extraction.

Although particular embodiments of the invention have been described in detail for purposes of illustration, various modifications and enhancements may be made without departing from the scope of the invention specified by the claims.

What is claimed is:

1. An apparatus for plant extraction comprising:
   a reservoir storing a liquid tetrafluoroethane;
   an extraction module including an extractor, a first inlet pipe, a first inlet pump disposed on the first inlet pipe, a first outlet pipe, a first outlet pump and a filter, wherein the extractor is configured to contain a plant material and is connected to the reservoir with the first inlet pipe and the filter is disposed at a bottom of the extractor for filtering the plant material, the first outlet pipe is connected between the extractor and the reservoir and the first outlet pump is disposed on the first outlet pipe for compressing a gaseous tetrafluoroethane into the liquid tetrafluoroethane, wherein the plant material is soaked in the liquid tetrafluoroethane from the reservoir to extract active components of the plant material and form a solution with the active components;
   a separating module including a separator, a heater and a first container, wherein the separator is connected to the bottom of the extractor with a second inlet pipe and connected to the reservoir with a second outlet pipe, the heater is disposed around the separator to vaporize the liquid tetrafluoroethane of the solution to a gaseous tetrafluoroethane and the first container is connected at a bottom of the separator to receive the active components left in the separator.

2. The apparatus as claimed in claim 1, wherein the extraction module further comprises a first heater disposed around the extractor.

3. The apparatus as claimed in claim 2, wherein the extractor further comprises an inlet valve and an outlet valve for inserting and releasing constituents needed for decarboxylation process.

4. The apparatus as claimed in claim 1, wherein the first inlet pipe is connected to bottom of the extractor.

5. The apparatus as claimed in claim 1, wherein the extraction module further comprises an assistant device disposed in the extractor for enhancing efficiency of extraction by increasing contact frequency and surface of the plant material and the liquid tetrafluoroethane.

6. The apparatus as claimed in claim 5, wherein the assistant device is selectively one of a stirrer, a set of cartridges or the combination thereof.

7. The apparatus as claimed in claim 1, wherein the separating module further comprises a second inlet pump disposed on the second inlet pipe.

8. The apparatus as claimed in claim 1, further comprising an external heat pump, wherein the heat pump has a heating element connected to the heater of the separating module and a cooling element connected to the reservoir, wherein the gaseous tetrafluoroethane in the separator is conducted by the second outlet pipe to the reservoir, cooled by the cooling element and liquefied to the liquid tetrafluoroethane.

9. The apparatus as claimed in claim 1, further comprising an air cooling device disposed between the separating module and the reservoir.

10. The apparatus as claimed in claim 1, further comprising at least one auxiliary reservoir storing an auxiliary solvent; and at least one auxiliary separating module corresponding to the auxiliary reservoir; wherein the at least one auxiliary reservoir is connected to the extraction module with a auxiliary pipe; wherein the plant material in the extraction module is soaked in the auxiliary solvent to extract active components of the plant material; and wherein the at least one auxiliary separating module is connected to the bottom of the extractor to separate the active components and the auxiliary solvent.

11. The apparatus as claimed in claim 10, wherein the auxiliary solvent is selectively one of a dry steam, a water-alcohol solution, a dimethyl sulfoxide or a water.

12. The apparatus as claimed in claim 10, further comprising a filter unit connected between the extraction module, the separating module and the at least one auxiliary separating module.

13. The apparatus as claimed in claim 12, wherein the filter unit is selectively one of a static phase absorber, a molecular sift, a column chromatography, a silica gel filament, a particle chromatography or a moving bed chromatography.

14. The apparatus as claimed in claim 1, further comprising a second outlet pump disposed on the second outlet pipe, wherein the gaseous tetrafluoroethane in the separator is conducted by the second outlet pipe to the second outlet pump, compressed into the liquid tetrafluoroethane and then conducted to the reservoir.

15. An apparatus for plant extraction comprising:
    a reservoir storing a liquid tetrafluoroethane;
    an extraction module including an extractor and a filter, wherein the extractor is configured to contain a plant material and is connected to the reservoir with a first inlet pipe and the filter is disposed at a bottom of the extractor for filtering the plant material, wherein the plant material is soaked in the liquid tetrafluoroethane from the reservoir to extract active components of the plant material and form a solution with the active components;
    a separating module including a separator, a heater, a vacuum distillation unit and a first container, wherein the separator is connected to the bottom of the extractor with a second inlet pipe and connected to the reservoir with an outlet pipe, the heater is disposed around the separator to vaporize the liquid tetrafluoroethane of the solution to a gaseous tetrafluoroethane, the vacuum distillation unit is disposed on the separator to receive the most volatile components of the active components, and the first container is connected at a bottom of the separator to receive the active components left in the separator; and
    an outlet pump disposed on the outlet pipe, wherein the gaseous tetrafluoroethane in the separator is conducted by the outlet pipe to the outlet pump, compressed into the liquid tetrafluoroethane and then conducted to the reservoir.

16. The apparatus as claimed in claim 15, wherein the vacuum distillation unit includes a multistage reflux rectification column, a condenser, a vacuum pump and a second container, wherein the multistage reflux rectification column is disposed on the separator, the condenser is connected to the multistage reflux rectification column, the vacuum pump is connected to the condenser, and the second container is connected to a bottom of the condenser.

17. An apparatus for plant extraction comprising:
a reservoir storing a liquid tetrafluoroethane;
an extraction module including an extractor and a filter, wherein the extractor is configured to contain a plant material and is connected to the reservoir with a first inlet pipe and the filter is disposed at a bottom of the extractor for filtering the plant material, wherein the plant material is soaked in the liquid tetrafluoroethane from the reservoir to extract active components of the plant material and form a solution with the active components;
a separating module including a separator, a heater and a first container, wherein the separator is connected to the bottom of the extractor with a second inlet pipe and connected to the reservoir with an outlet pipe, the heater is disposed around the separator to vaporize the liquid tetrafluoroethane of the solution to a gaseous tetrafluoroethane and the first container is connected at a bottom of the separator to receive the active components left in the separator;
an outlet pump disposed on the outlet pipe, wherein the gaseous tetrafluoroethane in the separator is conducted by the second outlet pipe to the outlet pump, compressed into the liquid tetrafluoroethane and then conducted to the reservoir; and
a pressure control device and a serpentine disposed on the second inlet pipe, wherein the pressure control device is configured to decompress the solution in the second inlet pipe and the serpentine is attached to the reservoir.

18. The apparatus as claimed in claim 17, wherein the pressure control device is a needle valve.

* * * * *